United States Patent [19]

Meyer

[11] 4,199,690
[45] Apr. 22, 1980

[54] CONTROL SYSTEM FOR ACTUATORS WHICH CAN BE SEPARATELY ENERGIZED AND DEENERGIZED

[75] Inventor: Frank Meyer, Dieburg, Fed. Rep. of Germany

[73] Assignee: Automation Industries, Inc., Los Angeles, Calif.

[21] Appl. No.: 824,638

[22] Filed: Aug. 15, 1977

[51] Int. Cl.² ........................................... G05D 23/00
[52] U.S. Cl. ................................... 307/41; 236/1 E; 165/26
[58] Field of Search .................. 236/1 E; 165/26; 307/117; 432/39; 307/41, 36

[56] References Cited

U.S. PATENT DOCUMENTS 3,844,425  10/1974  Keterson et al. ................. 165/26 X

*Primary Examiner*—L. T. Hix
*Assistant Examiner*—James L. Dwyer

*Attorney, Agent, or Firm*—Schwartz, Jeffery, Schwaab, Mack, Blumenthal & Koch

[57] ABSTRACT

A control system for actuators which can be separately energized. The controller of the system has a two-position control unit and a three-position control unit and is followed by constant current source circuits, a stepping switch unit with threshold switches having a stepped reference voltage, as well as a logic circuitry interconnecting the stepping switch unit and the two-position control output. Prevention of overshoot or undershoot is achieved by means of additional logic circuitry interconnecting the switches at the positive and negative output of said three-position control unit, said two-position control output, and said first mentioned logic circuitry between the stepping switch unit and two-position control output. In this manner overshoot can be prevented by quickly de-energizing the actuator, which was last energized, when the actual value in the controlled system closely approaches the set-point or reference value.

8 Claims, 1 Drawing Figure

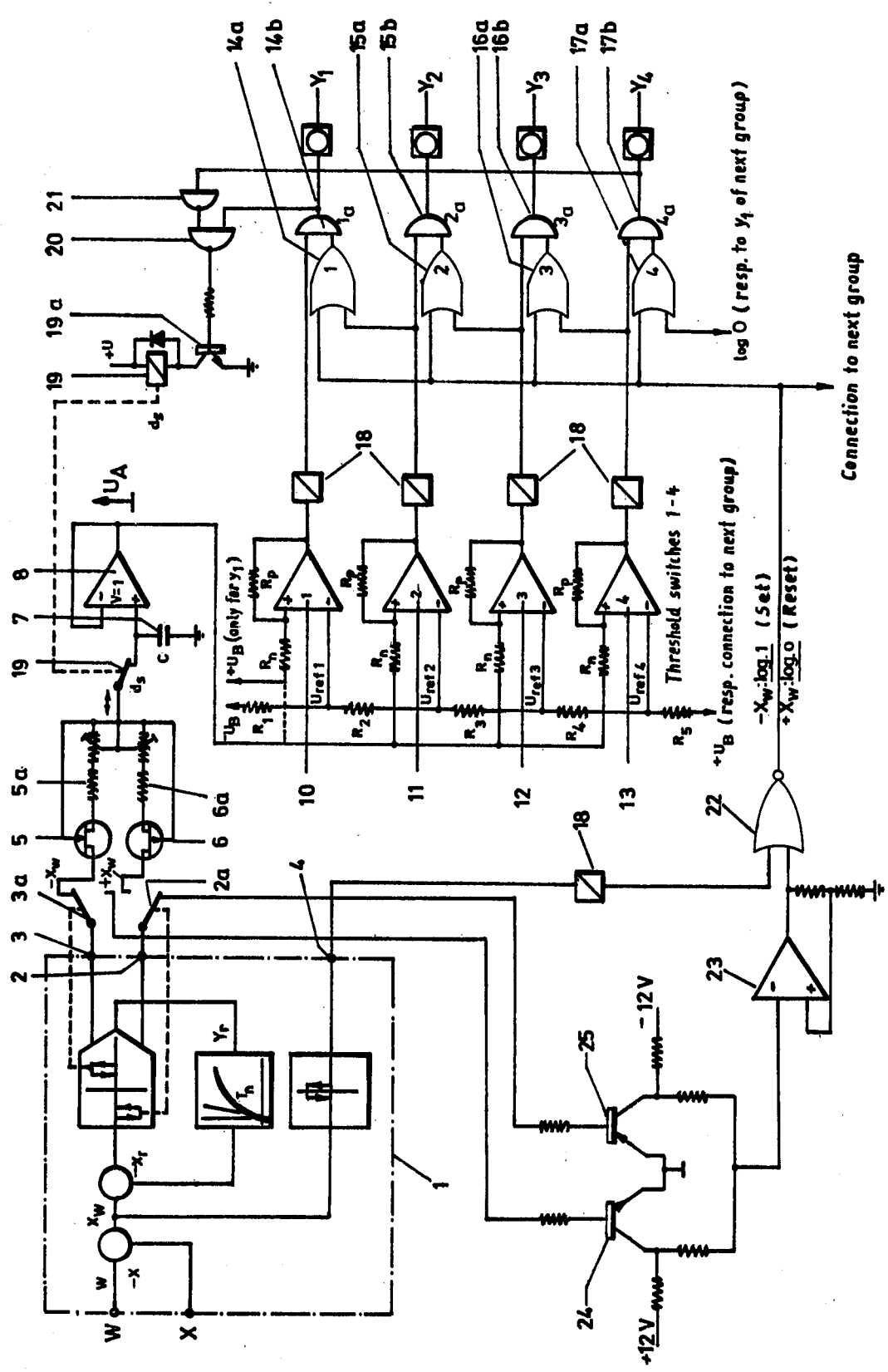

CONTROL SYSTEM FOR ACTUATORS WHICH CAN BE SEPARATELY ENERGIZED AND DEENERGIZED

BACKGROUND OF THE INVENTION

The invention relates to a control system with actuators which can be separately energized and deenergized.

An advantageous control system of this type has already been described in a published German Patent Application No. P 25 10 992.6.

The individual actuators are each associated with a partial manipulated variable which is a part of an overall manipulated variable. The control system or controller has a two-position control mode and comprises a conventional three-position controller with an output signal supplied to a stepping switch energizing the actuators. The stepping switch unit comprises a constant current circuit for each output of the three-position control unit, followed by a capacitor-/amplifier arrangement containing an operational amplifier with a high input resistance and an output connected with the parallel circuit of threshold switches with a stepped reference voltage, wherein one of these switches acts on a single one of the actuators.

In one form of the above control system the stepping switch unit is coupled with a two-position control unit by means of one AND-/OR-gate combination provided for each of the threshold switches, where the two-position control unit has an hysteresis ($H_Z$) lying in the non-operation region between the hysteresis curves of the three-position control unit. This coupling of the stepping switch unit is effected in such a manner, that the inputs of the AND-gates are each connected through an analog-TTL-converter with the outputs of the associated threshold switch on one hand and with the outputs of the associated OR-gates on the other hand, while the inputs of the OR-gates on one hand are jointly connected through and analog-TTL-converter with the output of the two-position control unit on the other hand are connected with the threshold switch of the succeeding switching stage. By means of this control system on one hand a control of the speed of switching on and switching off of the actuators is ensured and is proportional to the control error independently of the kind of the disturbance variable, and in addition a corrective overshoot of the three-position control is achieved, so that after the set-point conditions are reached, set point deviations which lie within the narrow limits of the hysteresis curve of the two-point control unit are already readjusted immediately.

The present invention has the objective to prevent the overshoot or undershoot of the set-point value or reference value, which occurs in the presence of large directed control errors due to the large change of the manipulated variable caused by this, for example in a heating system the removal of the nightly load drop.

In accordance with the invention, the pulse interrupters of the three-position control unit are designed as switching elements and a NOR-gate is provided between the output of the two-position control unit and the logic circuit. The other input of the NOR-gate is connected with the switching elements of the three-position control unit through an inverter-threshold switch and a double inverter (TTL-converter) formed by interconnected npn- and pnp-transistors in such a manner that the base of the pnp-transistor is connected with the switching element of the output for positive control errors and the basis of the npn-transistor is connected with the switching element of the output for negative control errors for the three-position control unit.

The invention utilizes the property of a three-position controller with differentiating feedback, where for a close approach to the actual value in the controlled system to the set-point or reference value, pulses with a direction opposed to the prior pulse direction are generated even before the set-point value is reached. In the above known control system the de-energizing of the last energized actuator is dependent on a discharging of the capacitor of the constant current source down to a threshold level which depends on the associated threshold switch. With the control system according to the invention in contrast to this known system the first occurence of these opposed pulses immediately results in a switching off of the last energized actuator. It has been found, that by means of this control action possible with the system according to the invention the unwanted overshooting of the set-point or reference value is substantially completely prevented, even under extreme operating conditions.

The invention together with its objects and advantages will become more readily apparent from the following description of an embodiment in connection with the drawing.

The drawing shows a schematic diagram of a control system in accordance with the invention. It shows a conventional step control unit 1 with outputs 2 and 3 for three-position control and an additional output 4 for two-position control. For a positive control error a potential of $-12$ volts is available at the output 2 and for a correspondingly large negatibe control error a potential of $+12$ volts is available at the output 3. Contrary to this, for a positive control error a positive potential of 10 volts is available at the two-position control output 4 and a negative potential of 10 volts is available at output 4 for a negative control error. Each output 2,3 of control unit 1 is connected to a stepping switch unit containing one constant current source circuit for each output. Each constant current circuit comprises a field effect transistor 5,6 with a variable resistor 5a, 6a connected to its output. The combined outputs of the constant current circuits are connected through an interruption relay contact 19 to one input of a capacitor/amplifier combination 7, 8 serving as a timing element, where the amplifier 8 is an operational amplifier with a high input resistance, for example $10^{14}$ ohms. The stepping switch unit further comprises a number of threshold switches having a stepped reference voltage and each affecting one actuator, which are connected in common to the output of the amplifier 8. In principle any number of such threshold switches may be connected in the stepping switch unit. In the embodiment shown by way of an example, four threshold switches 10–13 for a corresponding number of four actuators are provided, for example burner solenoid valves, which are connected to the terminals $Y_1$, $Y_2$, $Y_3$, and $Y_4$. The stepping switch unit and thus the three-position control unit is connected with the two-position control unit by means of a logic circuitry. For each threshold switch 10–13 this logic circuit consists of one combination of AND-/OR- gates 14a, 14b, ... 17a, 17b and this logic circuit is interconnected with the threshold switches 10–13 and with the two-position control output 4 in such a way, that the inputs of the AND-gates 14b–17b are connected with the output of the appropriate threshold switch 10-13 through an analog-TTL-converter 18 (analog-transistor-transistor-logic-converter) and at the other input are each connected with the output of the appropriate OR-gate 14a–17a. One input of each of the OR-gates 14a–17a is commonly connected to the two-position control unit output 4 and the other input is in each case connected to the threshold switch of the next following switching stage. The free input of the last OR-gate 17a in the array is marked by an arrow in the drawing and is connected to the positive potential (logic 1) or may be connected to the first switching stage $Y_1$ of a further succeeding group of switching stages (not shown in the drawing).

The common interrupter relay contact 19 is controlled by the system and is connected to the output of the constant current circuits. This interrupter 19 is actuated by means of a npn- switching transistor with a NAND-gate in its base circuit. One input of the NAND-gate 20 is directly connected to the output of the AND-gate 14b of the first switching stage $Y_1$ and its other input is connected with the output of the AND-gate 17b of the last switching stage $Y_4$ through an inverter 21. Furthermore, the signal path from the output of amplifier 8 to the first threshold switch 10 is interrupted and this input is permanently connected to a positive potential.

Furthermore, in accordance with the invention, the pulse interrupters of the three-position control unit 1 are switches 2a, 3a respectively and a NOR-gate 22 is provided between the two-position control output 4 and the logic circuit 14-17 in place of an analog-TTL-converter. The free input of this NOR-gate 22 is connected through an inverter-threshold switch 23 and a double inverter consisting of interconnected npn- and pnp-transistors 24,25 with the switches 2a, 3a of the three-position control unit in such a manner, that the base of the pnp-transistor 25 is connected to the switch 2a of the output for a positive control error and the base of the npn-transistor 24 is connected with the switch 3a of the output for a negative control error.

DESCRIPTION OF THE OPERATION

When a large negative control error occurs the actuators $Y_1$ to $Y_4$ are energized in short intervals by means of charging the capacitor 7 over threshold switches 10-13 and this causes a fast approach of the setpoint value by the controlled system. Simultaneously, a negative potential is available at the two-position control output 4 and therefore a logical zero is present at the appropriate input of the NOR-gate 22. Furthermore, because of the opening of the base circuit of the transistor 24 and because of the signal at the base of transistor 25 a positive potential appears at the input of the inverter threshold switch 23 and therefore, because of the inversion, a logical 0 appears at the input of the NOR-gate 22. This results in a logic 1 at the output of gate 22 as well as at the inputs of the gates 14a–17a, so that the switching on of the actuators is maintained in combination with the switching signals from the threshold switches 10–13.

In the following it is assumed, that the actuators $Y_1$ to $Y_3$ are switched on. In this case a logic 1 and a logic zero are present at the inputs of the OR-gate 16a and therefore the logic 1/logic 1 is present at the inputs of the AND-gate 16b. The values logic 1/logic 1 are available at the gates 14a and 15a. When the control system approaches the setpoint conditions rapidly and a premature pulse change is caused by this, a switching over of the switches 2a and 3a takes place and thus an interruption of the base circuit to the transistor 25, and a signal connection to the base of transistor 24. Because of this, the signal for the switch 23 and for the corresponding inputs of the gates 22 and 14a to 17a connected to this switch is a logic 0. Therefore, because only the second input of the OR-gate 16a for the last changed actuator receives a logic 0 and an immediate change of the switching command for the actuator $Y_3$ occurs, independent of the charge on the capacitor 7 and therefore of the potential existing at the threshold switch 12. The switching off command for the actuator $Y_3$ remains until the first time the actual value falls below the set point value, and due to the change of the pulses of the three-position controller the switching state described above is re-established. Since in the succeeding slow approach to the set point conditions no premature pulse change occurs, the inventive switch-off control remains inactive for the duration of stable control respectively set point conditions; however the overshoot by means of the two-position control 4 described in the above publication remains effective.

What I claim, is:

1. Control apparatus for controlling a plurality of actuators which may be individually energized and deenergized for controlling an external system such as a heating system, said apparatus having a three position controller and a two position controller, each responsive to deviations between an input setpoint and a measured value of said external system, said apparatus comprising:

(a) capacitor means for integrating outputs of said three position controller, said three position controller providing outputs for charging and discharging said capacitor means in response to positive and negative deviations between said setpoint and measured value, (b) a plurality of threshold switches, one threshold switch corresponding to each of said plurality of actuators, (c) means for interconnecting said threshold switches and said capacitor means in circuit for controlling said actuators for energization and deenergization in response to the amount of charge on said capacitor means, (d) said three position controller providing a first output in response to positive deviations between said setpoint and measured value in accordance with a first hysteresis curve and a second output in response to negative deviations between said setpoint and measured value in accordance with a second hysteresis curve, (e) said two position controller providing first and second outputs in response to positive and negative deviations between said setpoint and measured value in accordance with a third hysteresis curve positioned between said first and second hysteresis curves, and (f) logic means connecting said outputs of said two position controller to said actuators for controlling at least one of said plurality of actuators, whereby said two position controller and logic means control said at least one actuator in response to relatively small deviations and said three position controller and said capacitor means control said plurality of actuators in response to relatively large deviations.

2. The control apparatus as recited in claim 1 wherein said plurality of actuators are energized sequentially in response to outputs of said three position controller and said at least one actuator is said last actuator of said plurality to be energized.

3. The control apparatus as recited in claim 1 wherein said plurality of actuators are deenergized sequentially in response to outputs of said three position controller and said at least one actuator is said the first actuator to be deenergized.

4. The control apparatus as recited in claim 1 further comprising:
(a) switching means connecting said three position controller outputs to said capacitor means, one of said first and second outputs of said three position controller being a positive output pulse and the other being a negative output pulse.

5. The control apparatus as recited in claim 2 wherein said threshold switches provide a logic signal to a corresponding actuator and wherein said logic means comprises a plurality of logic gate means, each logic gate means corresponding to one of said actuators and having a first input connected to receive a first logic signal conditioned by said two position controller, a second input connected to receive a logic signal from a threshold switch corresponding to a sequentially energized actuator and a third logic signal from said corresponding threshold switch.

6. The control apparatus as recited in claim 5 wherein said logic means comprises an OR gate having first and second inputs connected to receive said first and second logic signals respectively and providing an output logic signal, and an AND gate connected to receive said output logic signal and third logic signal.

7. The control apparatus as recited in claim 6 further comprising a NOR gate having one input connected to the output of said two position controller and a second input connected to an inverter circuit which is connected between said NOR gate and said three position controller, said first logic signal provided by the output of said NOR gate.

8. The control apparatus as recited in claim 7 wherein said inverter circuit comprises:
(a) an inverter threshold switch having an output connected to said second input of said NOR gate, and
(b) a double inverter connected to the input of said inverter threshold switch, said double inverter comprising interconnected npn and pnp transistors.

* * * * *